United States Patent
Chapdelaine et al.

(10) Patent No.: US 12,469,190 B2
(45) Date of Patent: Nov. 11, 2025

(54) X-RAY TOMOGRAPHIC RECONSTRUCTION METHOD AND ASSOCIATED DEVICE

(71) Applicant: SAFRAN, Paris (FR)

(72) Inventors: Camille Jocelyn Roger Chapdelaine, Moissy Cramayel (FR); Sylvaine Picard, Moissy Cramayel (FR)

(73) Assignee: SAFRAN, Paris (FR)

( * ) Notice: Subject to any disclaimer, the term of this patent is extended or adjusted under 35 U.S.C. 154(b) by 492 days.

(21) Appl. No.: 17/913,711

(22) PCT Filed: Mar. 22, 2021

(86) PCT No.: PCT/FR2021/050475
§ 371 (c)(1),
(2) Date: Sep. 22, 2022

(87) PCT Pub. No.: WO2021/191542
PCT Pub. Date: Sep. 30, 2021

(65) Prior Publication Data
US 2023/0112738 A1    Apr. 13, 2023

(30) Foreign Application Priority Data
Mar. 26, 2020   (FR) ...................................... 2002980

(51) Int. Cl.
*G06T 11/00* (2006.01)
(52) U.S. Cl.
CPC .......... *G06T 11/006* (2013.01); *G06T 11/003* (2013.01); *G06T 2207/10081* (2013.01); *G06T 2211/424* (2013.01)

(58) Field of Classification Search
CPC ................. G06T 11/003; G06T 11/006; G06T 2211/424; G06T 2207/10081
See application file for complete search history.

(56) References Cited

U.S. PATENT DOCUMENTS

2008/0205729 A1\* 8/2008 Ziegler ................. G06T 11/006
                                                                 382/131
2013/0101190 A1   4/2013 Shi et al.
(Continued)

FOREIGN PATENT DOCUMENTS

| EP | 2 466 547 A1 | 6/2012 |
|---|---|---|
| WO | WO 00/25268 A2 | 5/2000 |
| WO | WO 2011/100628 A2 | 8/2011 |

OTHER PUBLICATIONS

Chapdelaine et al., "A 3D Bayesian Computed Tomography Reconstruction Algorithm with Gauss-Markov-Potts Prior Model and its Application to Real Data", 2017, IOS Press, Fundamenta Informaticae XXI (2017), p. 1-30. (Year: 2017).\*

(Continued)

*Primary Examiner* — Vincent Rudolph
*Assistant Examiner* — Timothy Choi
(74) *Attorney, Agent, or Firm* — Pillsbury Winthrop Shaw Pittman LLP

(57) ABSTRACT

An x-ray tomographic method for reconstructing an object, includes, on the basis of a plurality of images, each image in the plurality of images corresponding to a projection of the object, reconstructing the object using an iterative reconstruction method so as to produce a plurality of reconstructions $x_{(m)}$ of the object.

4 Claims, 2 Drawing Sheets

(56) References Cited

U.S. PATENT DOCUMENTS

2014/0270454 A1 9/2014 Chen et al.
2015/0287223 A1* 10/2015 Bresler ................ G06T 11/006
   382/131
2017/0294034 A1* 10/2017 Zhou .................... G06T 11/008

OTHER PUBLICATIONS

Wang et al., "Computed Tomography Reconstruction Based on a Hierarchical Model and Variational Bayesian Method", 2016, IEEE, 2016 IEEE International Conference on Acoustics, Speech and Signal Processing (ICASSP), p. 883-887. (Year: 2016).*
International Search Report as issued in International Patent Application No. PCT/FR2021/050475, dated Jul. 30, 2021.
Chapdelaine, C., "Bayesian iterative reconstruction methods for 3D X-ray Computed Tomography," PHD Thesis; Paris Saclay, (Year: 2019), 185 pages.
Micchelli, C. A., et al., "Universal kernels," Journal of Machine Learning Research, (Year: 2006), vol. 7, pp. 2651-2667.

* cited by examiner

[Fig. 1]
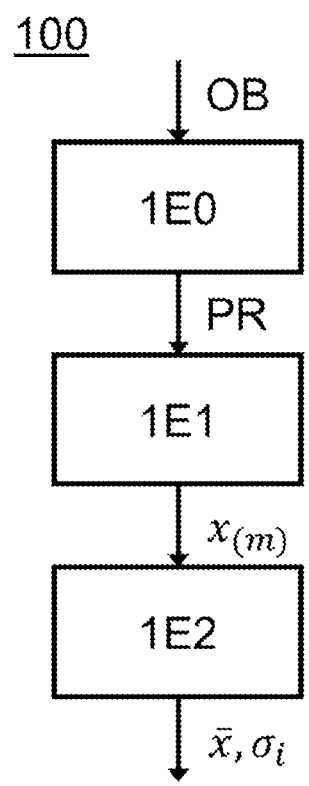
[Fig. 2]
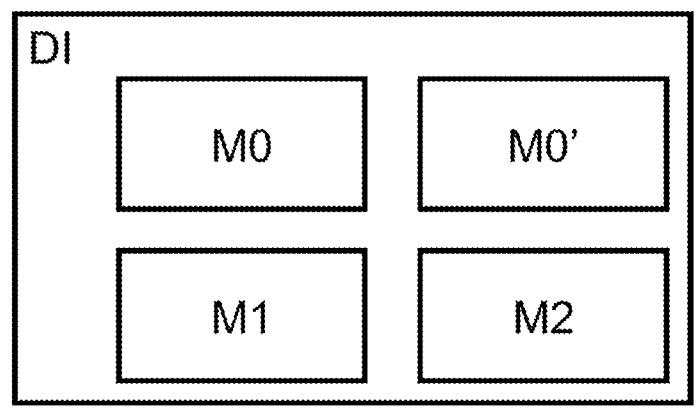

[Fig. 3]
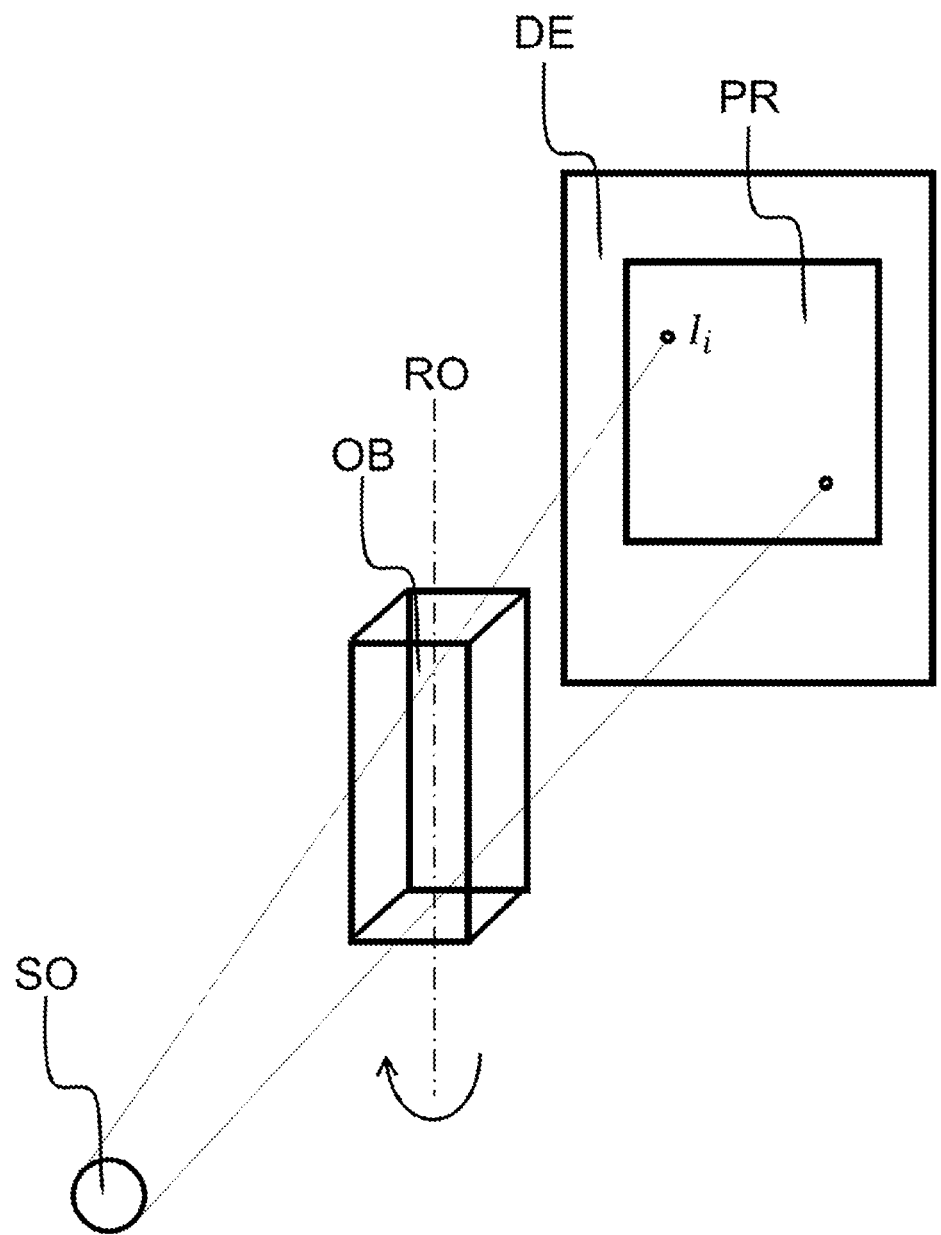

X-RAY TOMOGRAPHIC RECONSTRUCTION METHOD AND ASSOCIATED DEVICE

CROSS-REFERENCE TO RELATED APPLICATIONS

This application is the U.S. National Stage of PCT/FR2021/050475, filed Mar. 22, 2021, which in turn claims priority to French patent application number 2002980 filed Mar. 26, 2020. The content of these applications are incorporated herein by reference in their entireties.

TECHNICAL FIELD OF THE INVENTION

The technical field of the invention is that of X-ray non-destructive testing.

The present invention relates to an X-ray tomographic reconstruction method and in particular to a method implementing an iterative reconstruction method making it possible to obtain a plurality of reconstructions and, possibly, to obtain an average reconstruction as well as the uncertainty associated with each pixel/voxel of the latter. The present invention also relates to the device associated with this method.

TECHNOLOGICAL BACKGROUND OF THE INVENTION

X-ray imaging inspection requires the virtual reconstruction of the object under inspection from the projections obtained by passing X-rays through the object to be inspected and their subsequent detection at the output using an X-ray detector. This reconstruction is usually obtained by filtered back-projection methods. However, these methods suffer from reconstruction artefacts due to non-linear phenomena (such as beam scattering or hardening), photon counting uncertainties, or electronic noise of the detector.

To compensate for these artefacts, iterative reconstruction methods are used. These work by incorporating an a priori model (also called penalty or regularisation) on the object to be reconstructed. Typically, they are initialised using a first reconstruction obtained by a direct method such as filtered back-projection. Several iterative methods focus on speeding up the reconstruction. Other iterative methods aim at reconstructing the object under different energies in order to take into account the fact that the attenuation of the X-rays inside the object depends on the energy of the source. Finally, some iterative methods focus on reducing strong artefacts that are difficult to remove with standard iterative methods by working on the X-ray attenuation pattern inside the object.

However, in essence, reconstruction methods only give an estimate of the interior of the object to be inspected. As such, it is therefore interesting to have an uncertainty on each pixel of the reconstruction. However, given the large size of the reconstruction problem, the exact covariance matrix is not accessible in practice.

In order to overcome this limitation, a first approach consists in estimating a confidence level on the presence or absence of structures of interest in the reconstruction via a hypothesis test. These structures of interest correspond, for example, to particular defects in the context of industrial part inspection, or to lesions on a patient's organ in the context of medical diagnosis. In all cases, these structures of interest need to be known. A second, so-called unsupervised approach consists in estimating an uncertainty map in conjunction with the reconstruction. This approach has the advantage of highlighting the regions of the reconstruction for which the uncertainty is greatest.

However, the conventional reconstruction methods, by filtered back-projection or iterative, do not allow for uncertainty in the reconstruction obtained. Admittedly, the estimation of an uncertainty map on the whole virtually reconstructed object, already mentioned in the previous paragraph, is provided in chapter 6 of the document Bayesian iterative reconstruction methods for 3D X-ray Computed Tomography; Camille Chapdelaine; PhD Thesis; Paris Saclay, 2019 (via for example, the estimation of the standard deviation for each pixel). Nevertheless, the provided method neglects the correlations between the pixels in order to reduce the computational cost. This corresponds to a strong approximation which tends to suppress details in the reconstruction. However, these details can correspond to defects of major importance in the context of the inspection of an industrial part. In the medical context, these details may be important for diagnosing a potential disease or disorder. Thus, existing methods do not allow for the correct estimation of an uncertainty map on the reconstruction.

There is therefore a need for a method to obtain a plurality of reconstructions, which plurality of reconstructions can then be used to obtain an average reconstruction and an uncertainty associated with each pixel/voxel of that reconstruction.

SUMMARY OF THE INVENTION

The invention provides a solution to the problems previously discussed, by providing an iterative reconstruction method that ensures a good distribution of reconstructions.

For this, a first aspect of the invention relates to an X-ray tomographic reconstruction method for reconstructing an object, comprising, from a plurality of images (each image of the plurality of images corresponding to a projection of the object), a step of reconstructing the object by an iterative reconstruction method so as to obtain a plurality of reconstructions $x_{(m)}$ of the object, the iterative reconstruction method being implemented from the following expression:

$$x_{(m)}^{(t+1)} = x_{(m)}^{(t)} + \mu_t \varphi(x_{(m)}^{(t)}, x_{(l)}^{(t)}) \tilde{\varphi}(x_{(l)}^{(t)})$$

where $x_{(m)}^{(t+1)}$ is the reconstruction $x_{(m)}$ after its update at a time instant t, $x_{(m)}^{(t)}$ is the reconstruction $x_{(m)}$ before this update, $\mu_t \in \mathbb{R}$ is a step, $\varphi(x_{(m)}^{(t)}, x_{(l)}^{(t)})$, is a kernel function measuring the deviation between reconstruction m and reconstruction l at iteration t, $x_{(l)}^{(t)}$ is a reconstruction randomly chosen from the plurality of (t) reconstructions $x_{(m)}^{(t)}$ and $\tilde{\varphi}(x_{(l)}^{(t)})$ is a function given by the following expression:

$$\tilde{\varphi}(x_{(l)}^{(t)}) = H^T W \left[ \left( \frac{1}{M} \sum_{m=1}^{M} \varphi(x_{(m)}^{(t)}, x_{(l)}^{(t)}) \right) y - H \left( \frac{1}{M} \sum_{m=1}^{M} \varphi(x_{(m)}^{(t)}, x_{(l)}^{(t)}) x_{(m)}^{(t)} \right) \right] - \frac{1}{M} \sum_{m=1}^{M} \varphi(x_{(m)}^{(t)}, x_{(l)}^{(t)}) \nabla_{x_{(m)}^{(t)}} \Psi(x_{(m)}^{(t)}) + \frac{1}{M} \sum_{m=1}^{M} \nabla_{x_{(m)}^{(t)}} \varphi(x_{(m)}^{(t)}, x_{(l)}^{(t)})$$

where $H^T$ is a back-projection operator, W is a diagonal matrix whose diagonal coefficients $w_i$ with $i \in \{1, \ldots, D\}$ are weights assigned to each projection, M is a predefined number of reconstructions $x_{(m)}$, $\nabla_{x_{(m)}^{(t)}}$ is the gradient as a function of $x_{(m)}^{(t)}$, y is the vector representing the plurality of projections of the object and $\Psi(x)$ is a differentiable penalty function chosen according to an a priori model on the reconstruction x.

The reconstructions $x_{(m)}$ obtained using the iterative reconstruction method used in the method according to a first aspect of the invention are "pushed" using the function $\varphi(x_{(m)}^{(t)}, x_{(l)}^{(t)})$ to the modes of their distribution p(x|y) knowing the plurality of projections (represented by the vector y). The terms $\nabla_{x_{(m)}} \varphi(x_{(m)}^{(t)}, x_{(l)}^{(t)})$ cause the reconstructions to repel each other, thus ensuring the correct distribution of the reconstructions in the space of their distribution p(x|y) knowing the plurality of projections y. By virtue of this repulsion, obtaining realistic reconstructions $x_{(m)}$ (because they move towards the modes of their distribution knowing the projections) and diverse reconstructions (because they repel each other at each iteration of the iterative algorithm) is ensured.

In addition to the characteristics just discussed in the preceding paragraph, the method according to a first aspect of the invention may have one or more complementary characteristics among the following, considered individually or according to all technically possible combinations.

Advantageously, the method comprises, before the reconstruction step, a step of acquiring a plurality of images, each image of the plurality of images corresponding to a projection of the object, said acquisition being carried out using an X-ray imaging device.

Advantageously, the method comprises, after the reconstruction step, a step of determining, from the plurality of reconstructions $x_{(m)}$, an average reconstruction $\bar{x}$ and a disparity indicator $\sigma_i$ associated with each coefficient of the average reconstruction $\bar{x}$.

Advantageously, the disparity indicator associated with each coefficient of the average reconstruction $\bar{x}$ is equal to the standard deviation between the different values of the coefficient of the reconstructions $x_m$ of the plurality of reconstructions used to compute the considered coefficient of the average reconstruction $\bar{x}$.

A second aspect of the invention relates to a device comprising means configured to implement a method according to a first aspect of the invention.

Advantageously, the device according to a second aspect of the invention comprises an acquisition module configured to acquire a plurality of projections of an object.

A third aspect of the invention relates to a computer program comprising instructions which, when the program is executed by a computer, cause the computer to implement the method according to a first aspect of the invention.

A fourth aspect of the invention relates to a computer-readable data medium on which the computer program according to a third aspect of the invention is recorded.

The invention and its various applications will be better understood upon reading the following description and examining the accompanying figures.

BRIEF DESCRIPTION OF THE FIGURES

The figures are set forth by way of illustration and are in no way limiting the invention.

FIG. 1 shows a flow chart of a method according to a first aspect of the invention.

FIG. 2 shows a schematic representation of a device according to a second aspect of the invention configured to implement a method according to a first aspect of the invention.

FIG. 3 shows a schematic representation of an acquisition module used in a method according to a first aspect of the invention or a device according to a second aspect of the invention.

DETAILED DESCRIPTION

The figures are set forth by way of illustration and are in no way limiting the invention. Unless otherwise specified, a same element appearing in different figures has a unique reference.

A first aspect of the invention illustrated in FIGS. 1 to 3 relates to an X-ray tomographic reconstruction method 100 for reconstructing an object OB from a plurality of projections PR of the object.

In one embodiment, this plurality of projections PR is obtained during a step of receiving a plurality of projections PR. This plurality of projections PR may for example come from a remote imaging device. This reception step may be implemented by a communication module M0' comprising a communication means, for example a Wi-Fi, Bluetooth® or Ethernet communication means.

In an alternative embodiment, this plurality of projections PR is obtained during a step 1E0 of acquiring a plurality of images using an X-ray imaging device, each image of this plurality of images corresponding to a projection PR. This acquisition step can be implemented by an acquisition module M0 which will subject the object OB to be inspected to an X-ray beam so as to acquire a plurality of projections PR of the object OB according to several viewing angles.

This acquisition module M0 is schematically represented in FIG. 3 for the case of a 3D (three-dimensional) acquisition and in the case of a cone beam. More particularly, the object OB is placed between one or more X-ray sources SO (here, only one source has been represented) and a detector DE, the source(s) SO sending X-rays through the object OB. In FIG. 3, the X-rays are sent in a cone beam, but they can also be sent in a beam with a different geometry from this, for example a parallel beam. While represented in FIG. 3 for the 3D case, the acquisition device is easily transposable to the 2D case (two-dimensional—see for example Bayesian iterative reconstruction methods for 3D X-ray Computed Tomography; Camille Chapdelaine; PhD Thesis; Paris Saclay, 2019; FIG. 2.3 or A C. Kak and Malcolm Slaney, Principles of Computerized Tomographic Imaging, IEEE Press, 1988).

As a reminder, the intensity of the X-rays decreases as a function of the density f(r) encountered inside the object OB. After leaving the object, the X-rays are projected onto the detector DE which measures their intensities $l_i$. The X-rays projected onto the detector form an image called a projection PR of the object OB. Thus, a projection PR is formed of pixels representative of the intensity of the radiation measured by the detector DE. Several projections PR are thus acquired by rotating the object OB about a rotation axis RO.

In the following, the vector y will represent the plurality of projections PR of an object OB. Thus, the dimension of vector y denoted as D will be equal to the number of projections PR obtained, multiplied by the number of cells (that is, of pixels) of the detector DE.

The method 100 according to a first aspect of the invention then comprises, from the plurality of projections PR, a step 1E1 of reconstructing $x_{(m)}$ the object OB by an iterative reconstruction method so as to obtain a plurality of reconstructions $x_{(m)}$ of the object OB. Each reconstruction $x_{(m)}$ can be represented in the form of an image composed of pixels (for two-dimensional acquisition) or voxels (for three-dimensional acquisition). In the following, a reconstruction will be denoted as $x_{(m)}$ with $x_{(m)}$ E and m∈{1, ..., M} where N is the number of pixels (for the two-dimensional case) or voxels (for the three-dimensional case) in which the field of view is discretised and M is a predetermined number of reconstructions chosen by the user. For example, the user may choose to perform M=10 reconstructions. In particular, the user can choose larger values of M in order to better explore the space of the distribution of reconstructions knowing the projections PR. A limit for the choice of the value of M may be the memory capacity of the imaging system, or the time needed to perform the desired number of reconstructions. Step 1E1 may be implemented by an iterative reconstruction module M1, said module M1 comprising for example a computational means (such as a processor or an ASIC board) associated with a memory.

For reasons that will be detailed in the following, the iterative reconstruction method used in the present invention allows the reconstructions $x_{(m)}$ obtained to cover well the field of their distribution knowing the projections PR of the plurality of projections PR. This distribution is denoted as $p(x|y)$ and can be expressed using the following formula:

$$p(x \mid y) = \frac{\exp\left(-\frac{1}{2}\|y - Hx\|_W^2 - \Psi(x)\right)}{Z_y} \qquad [\text{Math. 1}]$$

where x is the considered reconstruction, $Z_y$ is a normalisation factor depending only on the vector y representing the plurality of projections PR but not on x, the function $\Psi$: $\mathbb{R}^N \to \mathbb{R}$ is a differentiable penalty function chosen according to an a priori model on the reconstruction x et the matrix H represents the linear projection operator defined by the model of X-ray attenuation through the object OB (the matrix product Hx representing the theoretical projections free of any beam measurement, scattering and hardening noise—for more details the reader may refer to chapter 3 of the document Bayesian iterative reconstruction methods for 3D X-ray Computed Tomography; Camille Chapdelaine; PhD thesis; Paris Saclay, 2019.

The function $\Psi(x)$ is usually defined in the following form:

$$\Psi(x) = \frac{1}{2}\|Dx\|_2^2 (1) \qquad [\text{Math. 2}]$$

where D is a linear transform (for example Haar wavelet transform). In particular, this formulation is chosen when the coefficients of the transform Dx are parsimonious. Of course, the function $\Psi(x)$ as defined in the previous equation is only an example and the present invention can be implemented using any function $\Psi(x)$ as long as $\Psi(x)$ is differentiable along x.

Moreover, the matrix W is a diagonal matrix whose diagonal coefficients $w_i$, $i \in \{1, \ldots, D\}$, are weights assigned to each projection PR so that, for any vector $v \in \mathbb{R}^D$, it is noted:

$$\|v\|_W^2 = \sum_{i=1}^{D} w_i v_i^2. \qquad [\text{Math. 3}]$$

The conventional iterative reconstruction methods set forth in the introduction estimate only a reconstruction $\hat{x}$ lying on a mode of the law $p(x|y)$, for example by solving the following optimization problem:

$$\hat{x} = \arg\left(\max_x (\ln(p(x \mid y)))\right) \qquad [\text{Math. 4}]$$

where $\hat{x}$ is the final reconstruction. In other words, it is a matter of determining the reconstruction x that corresponds to the object OB that most likely gave the plurality of projections PR represented here by the vector y. This is done for example via an iterative gradient method using the following formula:

$$x_{(m)}^{(t+1)} = x_{(m)}^{(t)} + \mu_t \nabla_{x_{(m)}^{(t)}} \ln(p(x_{(m)}^{(t)}|y)) = x_{(m)}^{(t)} + \mu_t (H^T W(y - Hx_{(m)}^{(t)}) - \nabla_{x_{(m)}^{(t)}} \Psi(x_{(m)}^{(t)})) \qquad [\text{Math. 5}]$$

where $x_{(m)}^{(t+1)}$ is the reconstruction $x_{(m)}$ after its update at a time instant t, $x_{(m)}^{(t)}$ is the reconstruction $x_{(m)}$ before this update, $\mu_t \in \mathbb{R}$ is a step, $\nabla_{x_{(m)}^{(t)}}$ the gradient as a function of $x_{(m)}^{(t)}$, $\ln(x)$ is the logarithm function, $p(x|y)$ is the distribution of reconstructions (introduced earlier), y is the vector representing the plurality of projections PR, $H^T$ is the back-projection operator, W is a diagonal matrix whose diagonal coefficients $w_i$, $i \in \{1, \ldots, D\}$, are weights assigned to each projection PR (introduced earlier) and $\Psi$ is a differentiable penalty function (introduced earlier).

However, such a solution has the drawbacks already detailed in the introduction.

Therefore, in order to overcome these, the inventors have developed an alternative iterative reconstruction method. In this method, the reconstruction is updated using the following expression:

$$x_{(m)}^{(t+1)} = x_{(m)}^{(t)} + \mu_t \varphi(x_{(m)}^{(t)}, x_{(l)}^{(t)}) \tilde{\varphi}(x_{(l)}^{(t)}) \qquad [\text{Math. 6}]$$

where $x_{(m)}^{(t+1)}$ is the reconstruction $x_{(m)}$ after its update at a time instant t, $x_{(m)}^{(t)}$ is the reconstruction $x_{(m)}$ before this update, $\mu_t \in \mathbb{R}$ is a time step, $\varphi(x_{(m)}^{(t)}, x_{(l)}^{(t)})$, is the measure of the deviation between the reconstructions m and l at iteration t, $x_{(l)}^{(t)}$ is a randomly chosen reconstruction and $\varphi(x_{(l)}^{(t)})$ is a function that will be defined in the following. The value of the projection $x_{(m)}$ is obtained by iterating between t=0 and t=$t_{max}$ in equal time steps where $t_{max}$ is set by the user. It is meant by "$x_{(l)}^{(t)}$ is a randomly chosen reconstruction" that, at each iteration of the iterative updating method according to the invention, a reconstruction $x_{(l)}^{(t)}$ (with $l \in \{1, \ldots, M\}$) is randomly chosen from the plurality of reconstructions $x_{(m)}^{(t)}$, the reconstructions $x_{(m)}$ then being updated using the reconstruction thus selected. The function $\varphi$ is such that $\varphi(x,x) \geq 0$ et $\varphi(x,x') = \varphi(x',x)$ for any $x, x' \in \mathbb{R}^N$. Examples of such functions $\varphi$, called kernel functions, can be found in Charles A; Micchelli, Yuesheng Xu, and Haizhang Zhang; Universal kernels; Journal of Machine Learning Research, 2006, vol. 7, pp. 2651-2667.

The function $\tilde{\varphi}(x_{(l)}^{(t)})$ used in the previous expression is given by the following expression:

$$\tilde{\varphi}(x_{(l)}^{(t)}) = \qquad [\text{Math. 7}]$$

$$H^T W\left(\left(\frac{1}{M}\sum_{m=1}^{M} \varphi(x_{(m)}^{(t)}, x_{(l)}^{(t)})\right) y - H\left(\frac{1}{M}\sum_{m=1}^{M} \varphi(x_{(m)}^{(t)}, x_{(l)}^{(t)}) x_{(m)}^{(t)}\right)\right) -$$

$$\frac{1}{M}\sum_{m=1}^{M} \varphi(x_{(m)}^{(t)}, x_{(l)}^{(t)}) \nabla_{x_{(m)}^{(t)}} \Psi(x_{(m)}^{(t)}) + \frac{1}{M}\sum_{m=1}^{M} \nabla_{x_{(m)}^{(t)}} \varphi(x_{(m)}^{(t)}, x_{(l)}^{(t)})$$

where $H^T$ is the back-projection operator (introduced earlier), W is a diagonal matrix whose diagonal coefficients $w_i$, with $i \in \{1, \ldots, D\}$, are weights assigned to each projection PR (introduced earlier), M is a predefined number of reconstructions (introduced earlier), $\nabla_{x_{(m)}^{(t)}}$ is the gradient as a function of $x_{(m)}^{(t)}$ (introduced earlier), y is the vector representing the plurality of projections PR of the object OB (introduced earlier) and $\Psi(x)$ is a differentiable penalty function chosen according to an a priori model on the reconstruction x (introduced earlier). Examples of such differentiable functions can be found in chapter 2, section 2.5 (equation 2.38), of the document Bayesian iterative reconstruction methods for 3D X-ray Computed Tomography; Camille Chapdelaine; PhD Thesis; Paris Saclay, 2019.

At the end of this reconstruction step 1E1, M reconstructions $x_{(m)}$ are obtained, which can then be used to detect a possible defect in the object OB. The production of a plurality of reconstructions $x_{(m)}$ allows for a finer analysis of the possible defects detected. For example, an operator who sees a defect in one of the reconstructions can examine the other reconstructions to verify the presence of this same defect. Indeed, the realism and diversity of the reconstructions obtained using a method 100 according to a first aspect of the invention make this comparison relevant. This realism and diversity are due to the fact that, in the iterative reconstruction method according to the invention, the reconstructions $x_{(m)}$ obtained are "pushed" using the function $\varphi(x_{(m)}^{(t)}, x_{(n)}^{(t)})$ to the modes of their distribution $p(x|y)$ knowing the plurality of projections PR (represented by the vector y) while ensuring their proper distribution in space.

As will be set forth now, this diversity allows the uncertainty associated to each pixel (for the two-dimensional case) or each voxel (for the three-dimensional case) of the reconstructed object OB, to be evaluated. For this, in one embodiment, the method 100 according to a first aspect of the invention comprises a step 1E2 of determining, from the plurality of reconstructions $x_{(m)}$, an average reconstruction denoted as $\bar{x}$ obtained by averaging the reconstructions $x_{(m)}$ of the plurality of reconstructions as well as a disparity indicator, denoted as $\sigma_i$, associated with each coefficient of the average reconstruction $\bar{x}$. By "Averaging the reconstructions $x_{(m)}$" it is meant that:

$$\bar{x} = \frac{\sum_{m=1}^{M} x_{(m)}}{M} \quad \text{[Math. 8]}$$

In one embodiment, the disparity indicator associated with each coefficient of the average reconstruction $\bar{x}$ is equal to the standard deviation between the different values of the coefficient of the reconstructions $x_m$ of the plurality of reconstructions used to compute the considered coefficient of the average reconstruction $\bar{x}$. In other words, by denoting as $\bar{x}(i)$ the $i^{th}$ coefficient of the vector $\bar{x}$ and as $x(i)_{(m)}$ the $i^{th}$ coefficient of the vector $x_{(m)}$, then the disparity indicator associated with this coefficient, denoted as $\sigma_i$ is given by the following expression:

$$\sigma_i = \sqrt{\frac{1}{M} \sum_{m=1}^{M} (x(i)_{(m)} - \bar{x}(i))^2}$$

Of course, other disparity indicators can be used to measure this uncertainty such as the variance or the interquartile range. In general, any statistical quantity that measures the dispersion in the coefficients of the reconstructions can be used as a disparity indicator. Similarly, the disparity indicator can be an aggregate measure of dispersion established from several statistical quantities measuring this dispersion.

At the end of this step 1E2, an average reconstruction z as well as the uncertainty associated with each coefficient of this average reconstruction are available. Knowing that such a reconstruction can be visualised in the form of an image in which each pixel (for the two-dimensional case) or each voxel (for the three-dimensional case) is associated with one and only one coefficient of the vector $\bar{x}$, it is possible to visualise a reconstructed image of the object OB as well as the uncertainty associated with each pixel/voxel of said image.

In one embodiment, the disparity indicator may take the form of a confidence map by virtue of which it is possible to visualise zones of the reconstruction benefiting from a high confidence index (that is, associated with a low disparity indicator) or alternatively zones benefiting from a low confidence index (that is, associated with a high disparity indicator). Thus, for example, an operator can analyse the presence of a defect, but also the uncertainty associated with that presence.

The step 1E2 of determining an average reconstruction z and a disparity indicator may be implemented by an average reconstruction and disparity indicator determination module M2, said module M2 comprising, for example, a computational means (such as a processor or an ASIC board) associated with a memory. In one embodiment, the iterative reconstruction module M1 and the average reconstruction and disparity indicator determination module M2 are the same.

A second aspect of the invention relates to a device DI comprising means configured to implement a method 100 according to a first aspect of the invention. In one embodiment, this device is an X-ray tomograph. The device DI according to a second aspect of the invention comprises a computational means (for example a processor or even an ASIC board) associated with a memory. The memory is further configured to store the instructions necessary for implementing a method according to a first aspect of the invention as well as the data necessary for this implementation. These elements may in particular be integrated within an iterative reconstruction module M1 and/or an average reconstruction and disparity indicator determination module M2. In one embodiment, the device DI comprises a communication module M0' comprising a communication means, for example a Wi-Fi, Bluetooth® or even Ethernet communication means. In one embodiment, the device DI comprises an acquisition module M0, for example an acquisition module as illustrated in FIG. 3. In one embodiment, the device DI also comprises a display means (for example a screen or a touch screen) and an input means (for example a keyboard, a mouse or a touch screen) so as to enable interaction between the operator and the device DI according to a second aspect of the invention.

The invention claimed is:

1. A method for determining a defect in an object by X-ray tomography, the method comprising:
   acquiring, using an X-ray imaging device, a plurality of X-ray projection images of the object from different viewing angles, each image corresponding to a projection of the object;
   reconstructing the object by an iterative reconstruction method from the plurality of projection images so as to obtain a plurality of reconstructions $x_{(m)}$ of the object, the reconstructing being carried out by a computational module comprising (i) a processor; and (ii) a memory storing instructions that, when executed by the processor, perform the iterative reconstruction method, wherein the iterative reconstruction method is implemented from the following expression:

$$x_{(m)}^{(t+1)} = x_{(m)}^{(t)} + \mu_t \varphi(x_{(m)}^{(t)}, x_{(l)}^{(t)}) \tilde{\varphi}(x_{(l)}^{(t)})$$

where $x_{(m)}^{(t+1)}$ is the reconstruction $x_{(m)}$ after its update at a time instant t, $x_{(m)}^{(t)}$ is the reconstruction $x_{(m)}$ before this update, $\mu_t \in \mathbb{R}$ is a step, $\varphi(x_{(m)}^{(t)}, x_{(l)}^{(t)})$, is a kernel function measuring the deviation between reconstruction m and reconstruction l at iteration t, $x_{(l)}^{(t)}$ is a reconstruction randomly chosen from the plurality of reconstructions $x_{(m)}^{(t)}$ and $\tilde{\varphi}(x_{(l)}^{(t)})$ is a function given by the following expression:

$$\tilde{\varphi}(x_{(l)}^{(t)}) = H^T W \left( \left( \frac{1}{M} \sum_{m=1}^{M} \varphi(x_{(m)}^{(t)}, x_{(l)}^{(t)}) \right) y - H \left( \frac{1}{M} \sum_{m=1}^{M} \varphi(x_{(m)}^{(t)}, x_{(l)}^{(t)}) x_{(m)}^{(t)} \right) \right) - \frac{1}{M} \sum_{m=1}^{M} \varphi(x_{(m)}^{(t)}, x_{(l)}^{(t)}) \nabla_{x_{(m)}^{(t)}} \Psi(x_{(m)}^{(t)}) + \frac{1}{M} \sum_{m=1}^{M} \nabla_{x_{(m)}^{(t)}} \varphi(x_{(m)}^{(t)}, x_{(l)}^{(t)})$$

where $H^T$ is a back-projection operator, W is a diagonal matrix whose diagonal coefficients $w_i$ with $i \in \{1, \ldots, D\}$ are weights assigned to each projection, M is a predefined number of reconstructions $x_{(m)}$, $\nabla_{x_{(m)}^{(t)}}$ is the gradient as a function of $x_{(m)}^{(t)}$, y is the vector representing the plurality of projections of the object and $\Psi(x)$ is a differentiable penalty function chosen according to an a priori model on the reconstruction x, and detecting a defect in the object and evaluating an uncertainty associated with the defect or with one or more regions of the object using the plurality of reconstructions $x_{(m)}$, wherein detection is based on comparing structural consistency or variability across the plurality of reconstructions, and uncertainty is determined from variations among the reconstructions.

2. The method according to claim 1, further comprising using the plurality of reconstructions $x_{(m)}$ to generate a final reconstructed image of the object, comprising an average reconstruction $\bar{x}$ and a disparity indicator $\sigma_i$ associated with each voxel of $\bar{x}$, the reconstructed image being configured for display or further inspection of the object.

3. A tomograph for determining a defect in an object, the tomograph comprising:
(a) an X-ray source configured to emit X-rays toward the object;
(b) a detector positioned to receive the X-rays after passage through the object and generate a plurality of projection images corresponding to different viewing angles;
(c) an acquisition module operatively coupled to the detector, the acquisition module configured to acquire the plurality of projection images of the object;
(d) a computational module comprising:
  (i) a processor; and
  (ii) a memory storing instructions that, when executed by the processor, cause the tomograph to:
    (1) perform an iterative reconstruction method based on the plurality of projection images to obtain a plurality of reconstructions x(m) of the object, wherein the iterative reconstruction method is implemented from the following expression:

$$x_{(m)}^{(t+1)} = x_{(m)}^{(t)} + \mu_t \varphi(x_{(m)}^{(t)}, x_{(l)}^{(t)}) \tilde{\varphi}(x_{(l)}^{(t)})$$

where $x_{(m)}^{(t+1)}$ is the reconstruction $x_{(m)}$ after its update at a time instant t, $x_{(m)}^{(t)}$ is the reconstruction $x_{(m)}$ before this update, $\mu_t \in \mathbb{R}$ is a step, $\varphi(x_{(m)}^{(t)}, x_{(l)}^{(t)})$, is a kernel function measuring the deviation between reconstruction m and reconstruction l at iteration t, $x_{(l)}^{(t)}$ is a reconstruction randomly chosen from the plurality of reconstructions $x_{(m)}^{(t)}$ and $\tilde{\varphi}(x_{(l)}^{(t)})$ is a function given by the following expression:

$$\tilde{\varphi}(x_{(l)}^{(t)}) = H^T W \left( \left( \frac{1}{M} \sum_{m=1}^{M} \varphi(x_{(m)}^{(t)}, x_{(l)}^{(t)}) \right) y - H \left( \frac{1}{M} \sum_{m=1}^{M} \varphi(x_{(m)}^{(t)}, x_{(l)}^{(t)}) x_{(m)}^{(t)} \right) \right) - \frac{1}{M} \sum_{m=1}^{M} \varphi(x_{(m)}^{(t)}, x_{(l)}^{(t)}) \nabla_{x_{(m)}^{(t)}} \Psi(x_{(m)}^{(t)}) + \frac{1}{M} \sum_{m=1}^{M} \nabla_{x_{(m)}^{(t)}} \varphi(x_{(m)}^{(t)}, x_{(l)}^{(t)})$$

where $H^T$ is a back-projection operator, W is a diagonal matrix whose diagonal coefficients $w_i$ with $i \in \{1, \ldots, D\}$ are weights assigned to each projection, M is a predefined number of reconstructions $x_{(m)}$, $\nabla_{x_{(m)}^{(t)}}$ is the gradient as a function of $x_{(m)}^{(t)}$, y is the vector representing the plurality of projections of the object and $\Psi(x)$ is a differentiable penalty function chosen according to an a priori model on the reconstruction x,
    (2) detect a defect in the object and evaluate an uncertainty associated with the defect or with one or more regions of the object using the plurality of reconstructions x(m), wherein detection is based on comparing structural consistency or variability across the plurality of reconstructions, and uncertainty is determined from variations among the reconstructions,
(e) a display device configured to display the plurality of reconstructions x(m).

4. The tomograph according to claim 3, wherein the computational module is configured to use the plurality of reconstructions x(m) to generate a final reconstructed image of the object, comprising an average reconstruction $\bar{x}$ and a disparity indicator $\sigma_i$ associated with each voxel of $\bar{x}$, the reconstructed image being configured for display or further inspection of the object.

* * * * *